March 18, 1930. S. D. NOGGLE 1,751,351

MACHINE FOR CUTTING GREEN CORN FROM THE COB

Filed July 2, 1928  5 Sheets-Sheet 1

INVENTOR
Sam D. Noggle.
BY
ATTORNEY

March 18, 1930.  S. D. NOGGLE  1,751,351
MACHINE FOR CUTTING GREEN CORN FROM THE COB
Filed July 2, 1928  5 Sheets-Sheet 3

INVENTOR
Sam D. Noggle.
BY
Albert E. Dietrich
ATTORNEY

March 18, 1930.  S. D. NOGGLE  1,751,351
MACHINE FOR CUTTING GREEN CORN FROM THE COB
Filed July 2, 1928  5 Sheets-Sheet 4

INVENTOR
Sam D. Noggle.
BY
ATTORNEY

Patented Mar. 18, 1930

1,751,351

UNITED STATES PATENT OFFICE

SAM D. NOGGLE, OF CANAL WINCHESTER, OHIO

MACHINE FOR CUTTING GREEN CORN FROM THE COB

Application filed July 2, 1928. Serial No. 289,917.

The invention generally relates to machines for cutting green corn from the cob and primarily has for its object to provide a new and improved cutter unit adaptable for use in such machines which is readily mountable in and removable from the machine as a unit, is simple and compact in construction, and on which the cutting elements are mounted in a manner enabling them to automatically accommodate varied sizes of corn ears and to efficiently cut the kernels therefrom without danger of the said cutting elements moving out of proper position and effecting a choking of the machine.

Another object of the invention is to provide a standard construction of cutter element carrying unit universally mountable on the machine so that any given unit may be mounted to present its cutting planes transversely of the path of travel of the corn in the horizontal or vertical direction according to choice.

A further object of the invention is to provide a cutter unit in which novel means is provided to positively cause the cutting elements to separate in parallel relation when forced apart by the passing corn.

The invention further comprehends the provision in the cutter element mounting means, of devices to equalize the effects of gravity on the said elements, and of means to enable quick and convenient removal and replacement of said cutting elements and to overcome all tendency of the cutting elements to rock or move out of proper alignment.

More specifically, the invention further resides in the provision of a standard cutter element carrying unit in which is provided a selectively mountable plate, oscillatable rings, rotative one within another, a pair of opposed corn engaging element carriers, elements carried by the carriers, means to slot and pin connect one end of one carrier and the opposite end of the other carrier to one ring at diametrically opposite points one above and one below a line drawn between the carriers, and yieldable means tending to oscillate the rings to force the carriers toward each other.

Another object of the invention is to provide adjustable gages with double ends and fastenings, and to provide the knives with double end fastenings in order to hold the knives against flexing out of position during engagement with the corn.

Further it is an object of the invention to provide gage sets each member of which is of like construction whereby a single pattern and jig will suffice in the production of all gages; also to provide knife sets each member of which is of like construction, thereby reducing the number of parts necessary to be kept in stock, as well as reducing the cost of manufacture of the machine as a whole and enabling the knives to be interchanged promiscuously.

Other objects will in part be obvious and in part be pointed out hereinafter.

To the attainment of the aforesaid objects and ends, the invention further resides in the novel details of construction, combination and arrangement of parts, all of which will be first fully described in the following detailed description, then be particularly pointed out in the appended claims, reference being had to the accompanying drawings in which:—

Figure 6 is a face view illustrating the oscillatable rings.

In the drawings 1 generally designates the machine frame and 2 the housing in which the cutter units are universally removably mounted. The green corn acted upon in the housing enters the said housing through the entrance doorway 3 and the stripped cobs are discharged through the exit doorway 4, suitable delivery mechanism for delivering the cobs of green corn to the housing being provided and generally indicated at 5.

Figure 1:
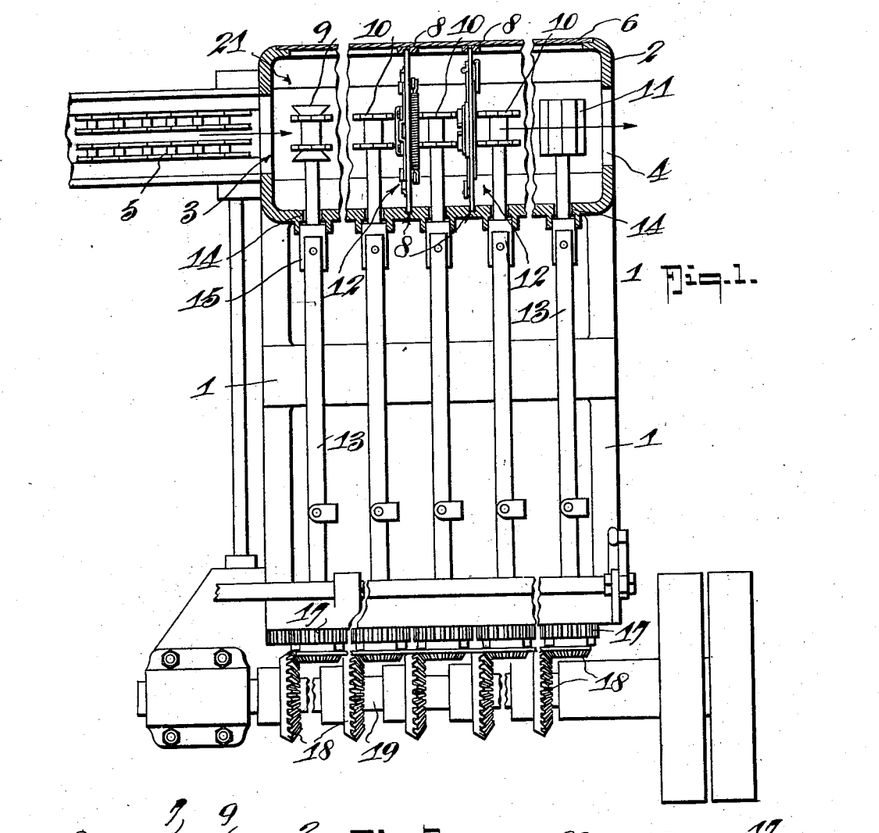
Figure 1 is a horizontal section of so much of a green corn cutting machine as is necessary to an understanding of the application of the invention.
Figure 2:
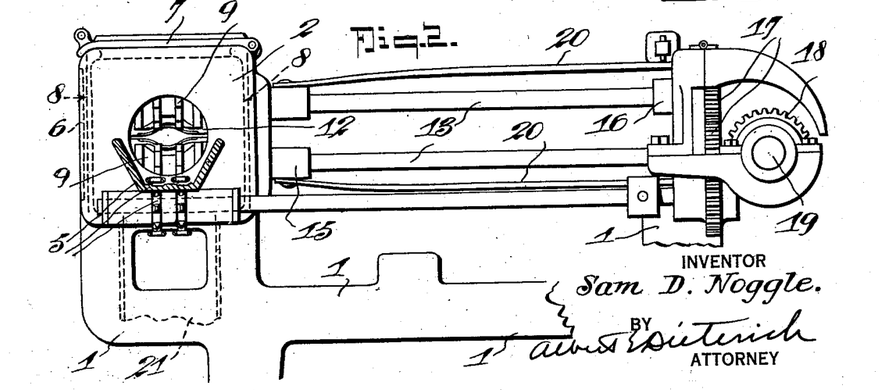
Figure 2 is a fragmentary end view looking toward the intake end of the machine.
Figure 3:
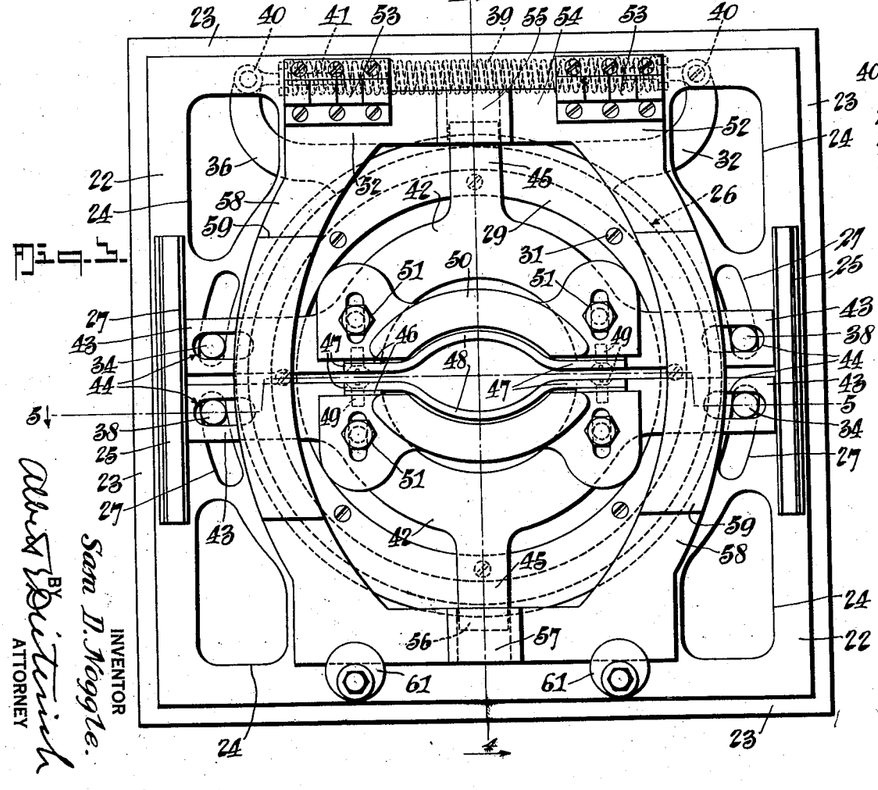
Figure 3 is a face view illustrating the invention.
Figure 7:
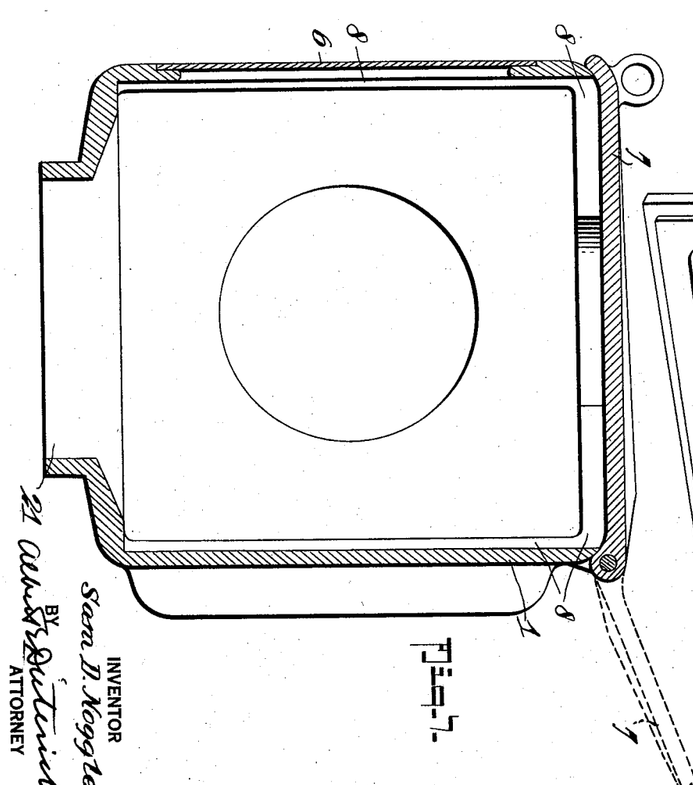
Figure 7 is a cross section of a machine housing, groove equipped to receive the units.

The housing may be provided with a removable cover 6 along one side wall through which access may be had to the interior of the housing, and a top cover 7 is hingedly mounted to cover the open top of the housing to facilitate the mounting and removal of the cutter units into and out of the receiving transverse grooveways 8 with which the housing is provided, see Figures 1, 2 and 7.

In this disclosure I have referred to the units throughout as cutter units. In this type of machine it is common to employ cutters for stripping the kernels from the cobs and also slicers and scrapers. It is to be understood therefore that although I have referred to the elements which act on the corn as cutters, scraper and slicer elements may also be carried by the units when desired.

In machines of this type it is common to employ star wheel and cone disk feeders, plain spaced star wheels and star cylinder rolls for feeding the green corn through the housing in which the cutters, or slicers, cutters and scrapers are mounted, and in Figures 1 and 2 of the drawings I have indicated these feeding devices at 9, 10 and 11 respectively. In the said Figures 1 and 2, which illustrate the general construction of an accepted type of green corn cutting machine, and which have for their purpose to illustrate the manner of mounting the units, the said slicer, cutter or scraper units are generally designated 12. These units will be described in detail hereinafter.

The feeding devices 9, 10 and 11 are secured on the ends of long shafts 13 which project into the housing through vertical slotways 14 and pass through movable bearings 15 adjacent the housing and through relatively stationary bearings 16 near the other ends of the shafts. The other ends of the shafts have secured thereon gears 17 which intermesh and are driven by beveled pinions 18 from a power shaft 19 to which power is applied in any suitable manner. Spring arms 20 are connected to the movable bearings 15 and yieldably force the cooperating pairs of upper and lower feeding devices 9, 10 and 11 toward each other, the cuttings falling to a receiving troughway 21 along the bottom of the housing.

Figure 8:
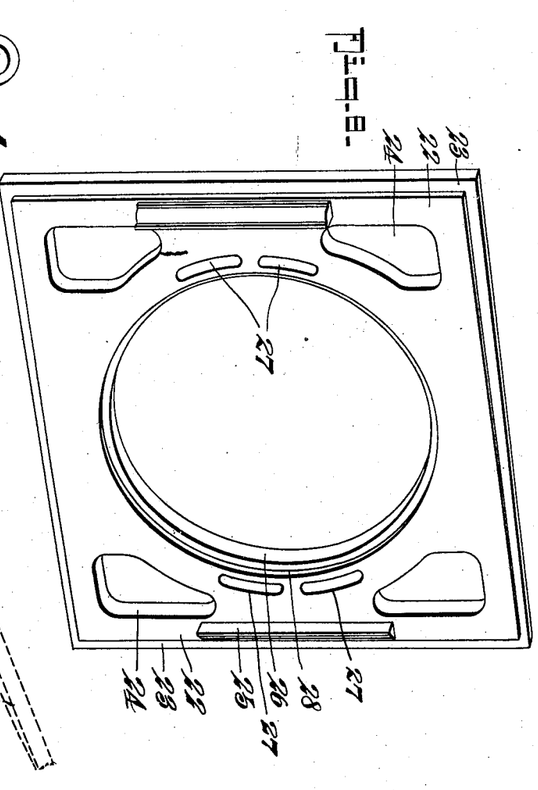
Figure 8 is a perspective view of one of the main carrying plates.

In carrying out the invention I provide a square carrier plate 22 for mounting edge flanges 23 around all four sides. Thus the plate is provided with pairs of parallel mounting edges which may be selectively mounted in the housing troughways 8. The plate 22 may be cut out as at 24 to save metal, lighten the construction and facilitate cleansing of the unit.

The plate 22 is provided with a pair of guide ears or lugs 25 cast integrally or secured thereon, and the said plate also includes a central circular opening 26 and two pairs of arcuate slots 27, the purpose for all of which will later be apparent.

The opening 26 is counterbored at 28 to receive a ring 29 to which another ring 30 is screw-secured as at 31. The ring 30 is provided with a projecting spring lever lug 32 and a pair of diametrically oppositely arranged lugs or extensions 33, each of which lugs is provided with a projecting pin 34.

Another ring 35 is rotatably mounted on the ring 30 and in the plate opening, and the said ring 35 is also provided with a spring lever lug or projection 36 and a pair of diametrically oppositely positioned lugs or projections 37, which, like the lugs 33, are each provided with a projecting pin 38.

A retractile spring 39 is connected at its ends as at 40 to the lever arms or lugs 32 and 36, one of said connections being adjustable as at 41 so that the tension of the spring may be varied to suit conditions of operation. The spring tends to yieldably hold the rings 30 and 35 at the normal or at rest position illustrated in Figure 6. Each unit includes a pair of carrier bars 42 each comprising a semi-circular ring body having end extensions 43 which are longitudinally slotted as at 44, and an intermediate extension lug 45, the purpose for which will later be described.

Figures 9, 10, 11, 12:
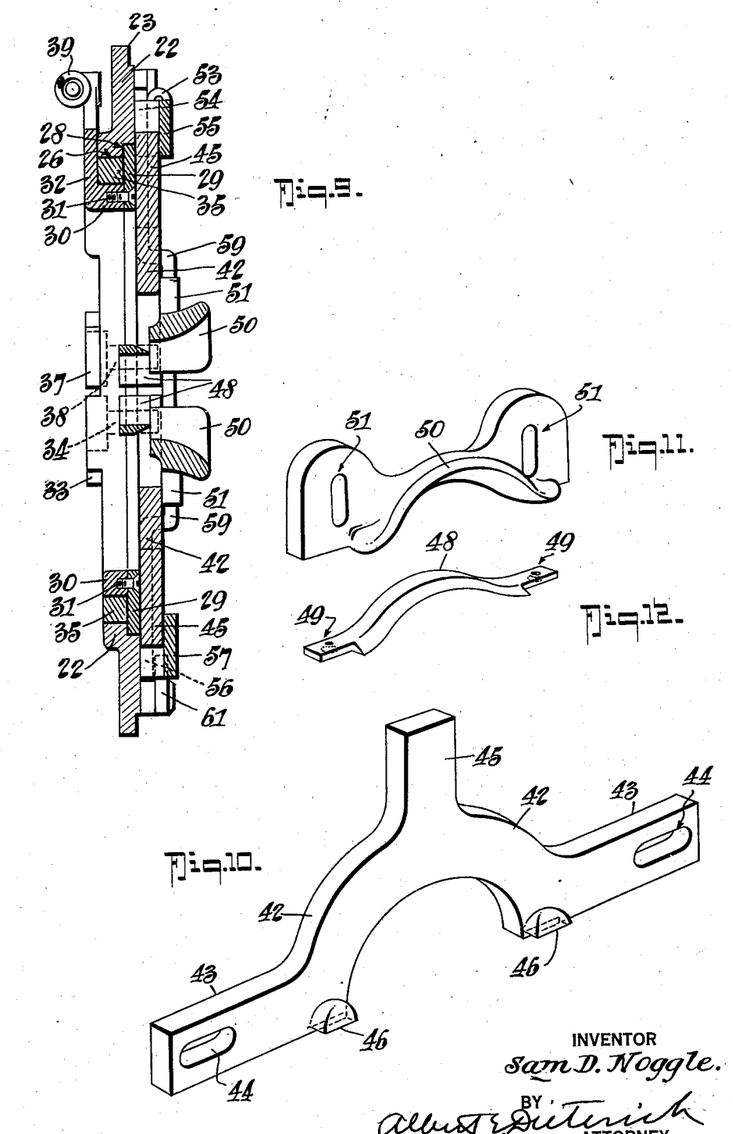
Figure 9 is a vertical cross section taken on the line 4—4 on Figure 3.
Figure 10 is a perspective view of one of the cutter element carrier bars.
Figures 11 and 12 are detail perspective views illustrating a gage and a knife respectively.

Each bar 42 also includes a pair of securing lugs 46 to which the end extensions 47 of the curved knives 48 (or other implements such as slicers or scrapers when desired) are secured as at 49.

A flared guide or gage head 50 is adjustably secured as at 51 to each bar 42. The heads 50 flare out in advance of and in associated relation to the knives 48 so that they will be engaged by the travelling ears of corn and separated thereby to guide and position the cut of the knives to assure removal of the kernels regardless of the general contour or taper of the ears.

When the parts are assembled the pins 34 and 38 project through the plate slots 27 and into the slots 44 of the carrier bars 42. The carrier bars are merely slipped over the pin ends, there being no positive securing means necessary to secure the said bars on the pins.

To suitably hold the bars 42 to their position on the projected pins I provide a latch plate 52 which is hinged as at 53 to the plate 22 and has a strap portion 54 grooved at 55 to snugly fit over the extension lug 45 of one of the carrier bars, and another strap portion 56 grooved as at 57 to snugly fit over the lug 45 of the other of the bars 42. The strap portions 54 and 56 are joined by connecting portions 58 which are also grooved at 59 to snugly fit over the extensions 43 or end lugs of the carrier bars 42. Pivoted latches 61 are carried by the plate and are adapted to be turned to lap over the free end of the latch plate and secure it to position. The extensions or lugs 45 of the bars 42 and the end lugs 43 of the said bars are slidably mounted in the grooveways 57 and 59 so that while the latch plate 52 secures the said bars to position on their respective mounting pins it does not interfere with the opening and closing movement of the said bars.

Figure 4:
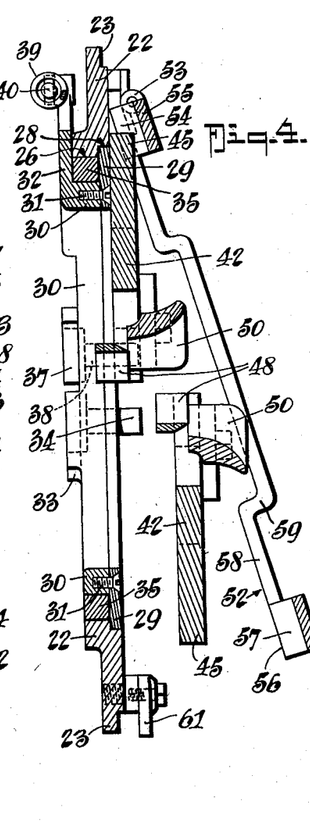
Figure 4 is a vertical cross section taken on the line 4—4 on Figure 3, the carrier bars keeper latch plate being raised and one carrier bar being shown removed from its mounting.
Figure 5:
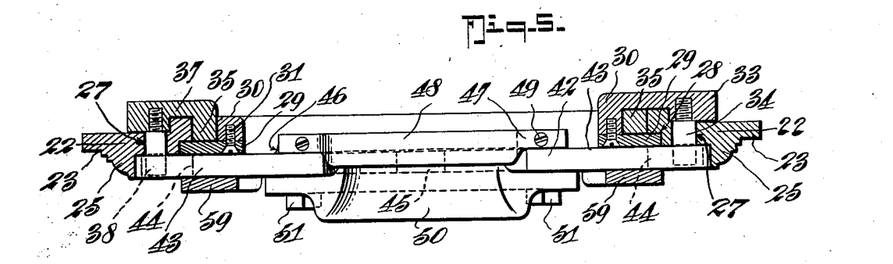
Figure 5 is a horizontal section taken on the line 5—5 on Figure 3.

To remove the bars 42 it is only necessary to turn the latches 61 and swing the plate upwardly on its hinge connection. The bars may then be freely removed from their slot and pin connections. See Figure 4.

The cutter units are standard in construction and universally mountable in the housing so that alternate ones of the units may be reversely positioned to cause the knives of one unit to oppose each other in a horizontal plane and those of the next unit to oppose each other in a vertical plane and thus assure perfect stripping of the kernels from the cobs.

It will be observed by reference to Figure 6 and other figures of the drawings that the diametrically oppositely positioned pins 34 and 38 of the rings 30 and 35 respectively interengage with the opposite end extension lugs 43 of opposite carrier bars 42. Thus when the carrier bars are forced apart, by reason of the provision of the oscillatable rings and the pin and slot connections, each said bar will impart an up thrust to one pin and a corresponding down thrust to the diametrically opposite pin.

In this manner the cutter bars 42 and the knives carried thereby are caused to separate in a truly parallel relation. This arrangement further provides for equalization of gravitational pull on the carrier bars 42 since downward pull on either of the bars will, through distribution of the force through the rings 30 and 35, occasion a like up thrust on the other bar 42.

By changing the position of the gages 50 on the bars 42 the depth of cut made by the knives may be regulated to suit requirements.

Particular attention is directed to the fact that the carrier bars 42, the gages 50 and the knives 48 are of standardized construction and thus are interchangeable and may be promiscuously selected for original assembly or replacement.

Three part patterns only are necessary in the production of these parts and it is necessary to provide only three impounding bins for the retainment of spares or replacements for these units, thus reducing individual patterns and storage space to the minimum.

By reason of their double end mounting, proper engagement with the travelling corn is assured at all times, there being no unsupported ends free to be sprung out of alignment or to toe into the corn and effect a choking of the machine.

Further, these units are so constructed and mounted that there are no parts projecting beyond the machine housing to be broken or knocked out of position during installing or shipping and cause inconvenience in mounting.

By provision of the latch plate 52 means is not only provided for facilitating the quick removal of the cutter bars but the three point bearing provided thereby for each bar at the points 43, 45, 43 assures against tilting of the bars and eliminates the possibility of the knives toeing into the corn ears and choking the machine.

All of the parts are simple in construction and standard so that they may be readily interchanged and the units themselves are standard so that they may be mounted universally and by unskilled labor. They are also constructed in such a manner that they are practically fool-proof in that they do not provide any complicated adjustment features that may be readily thrown out of order by tinkering mechanics.

The simple construction of the unit and the ready removable feature of its mounting also contributes greatly towards the cleanliness of the machine as the said elements permit of easy removal for washing and scalding of the units.

From the foregoing description, taken in connection with the accompanying drawings, it is thought that the novel details of construction, the manner of use and the advantages of my invention will be readily apparent to those skilled in the art to which it relates.

What I claim is:

1. In a machine for cutting green corn from the cob, the combination with the housing, of a cutter member carrying unit having thereon transversely arranged cutters, said unit having provision to enable it to be universally mountable in the housing to permit presentation of its cutters in one or the other of two cutting planes one normal to the other.

2. In a machine for cutting green corn from the cob, the combination with the housing having transverse grooveways, of a cutter member carrying plate mountable in selective positions in the grooveways whereby to permit the convenient varying of the position of cutters carried by the plate relatively to the travelling corn, and cutters carried by the plate for the purpose described.

3. In a machine for cutting green corn from the cob, a cutter unit comprising a carrying body, opposed cutter elements carried by the body, and means actuated by engagement with the travelling corn to separate the cutter elements following the contour of the corn ears and to positively cause said elements to move in parallel relation while separating.

4. In a machine for cutting green corn from the cob, a cutter unit comprising a carrying body, opposed cutter elements carried by the body, and means actuated by engagement with the travelling corn to separate the cutter elements following the contour of the corn ears and to positively cause said elements to move in parallel relation while separating, said means including reversely rotatable rings connected to the cutter elements, means to engage the travelling corn and be moved thereby to cause relative movement of the rings in one direction, and yieldable means to normally force the rings in the opposite direction.

5. In a machine for cutting green corn from the cob, a cutter unit comprising a carrying body, opposed cutter elements carried by the body, and means actuated by engagement with the travelling corn to separate the cutter elements following the contour of the corn ears and to positively cause said elements to move in parallel relation while separating, said means including reversely rotatable rings rotatable one on the other and connected to the cutter elements, means to engage the travelling corn and be moved thereby to cause relative movement of the rings in one direction, and yieldable means to normally force the rings in the opposite direction.

6. In a machine for cutting green corn from the cob, a cutter unit comprising a carrying body, opposed cutter elements carried by the body, and means actuated by engagement with the travelling corn to separate the cutter elements following the contour of the corn ears and to positively cause said elements to move in parallel relation while separating, said means including reversely rotatable rings, said rings each being connected at opposite sides of its center with the opposite ends of opposite cutter elements, means to engage the travelling corn and be moved thereby to cause relative movement of the rings in one direction, and yieldable means to normally force the rings in the opposite direction.

7. In a machine for cutting green corn from the cob, a cutter unit comprising a carrying body, opposed cutter elements carried by the body, and means actuated by engagement with the travelling corn to separate the cutter elements following the contour of the corn ears, and means to equalize the effect of gravitational pull on the cutter elements to distribute said pull evenly to said cutter elements.

8. In a machine for cutting green corn from the cob, a cutter unit comprisng a carrying body, opposed cutter elements carried by the body, and means actuated by engagement with the travelling corn to separate the cutter elements following the contour of the corn ears and to positively cause said elements to move in parallel relation while separating, said last named means including means to equalize the effect of gravitational pull on the cutter elements to distribute said pull evenly to said cutter elements.

9. In a machine for cutting green corn from the cob, a cutter unit comprising a carrying body, opposed cutter elements carried by the body, and means actuated by engagement with the travelling corn to separate the cutter elements following the contour of the corn ears and to positively cause said elements to move in parallel relation while separating, said means including reversely rotatable rings connected to the cutter elements, means to engage the travelling corn and be moved thereby to cause relative movement of the rings in one direction, said rings each having a lever arm extension, and a single spring connected to the lever arm extensions and serving to normally force the rings in the opposite direction.

10. In a machine for cutting green corn from the cob, a cutter unit comprising a carrying body, opposed cutter elements carried by the body, and means actuated by engagement with the travelling corn to separate the cutter elements following the contour of the corn ears and to positively cause said elements to move in parallel relation while separating, said means including reversely rotatable rings, said rings each being pin and slot connected at opposite sides of its center with the opposite ends of opposite cutter elements, means to engage the travelling corn and be moved thereby to cause relative movement of the rings in one direction, and yieldable means to normally force the rings in the opposite direction.

11. In a machine for cutting green corn from the cob, a cutter unit comprising a carrying body, opposed cutter elements carried by the body, and means actuated by engagement with the travelling corn to separate the cutter elements following the contour of the corn ears, said cutter elements being slot and pin connected to the said separating means to provide for the separating movement and to facilitate removal and replacement of the cutter elements, and a latch plate carried by the carrying body and overlying the cutter elements to secure them to position.

12. In a machine for cutting green corn from the cob, a cutter unit comprising a carrying body, opposed cutter elements carried by the body, and means actuated by engagement with the travelling corn to separate the cutter elements following the contour of the corn ears, said cutter elements being slot and pin connected to the said separating means to provide for the separating movement and to facilitate removal and replacement of the cutter elements, and a latch plate carried by the carrying body and overlying the cutter elements to secure them to position, said latch plate and said cutter elements having interengaging parts to overcome tilting tendencies of the cutter elements when they are engaging the travelling corn.

13. In a machine for cutting green corn from the cob, a cutter unit comprising a carrying body having a central opening, cutter element carrying bars having slotted end extensions, cutter elements and gages carried by the bars, bar moving devices carried by the carrying body and mounted in the opening thereof, pins projecting from the moving devices into the slotted ends of the bars, a latch member carried by the carrying body and adapted to removably secure the bars to position, and yieldable means to hold the moving devices in their normal position.

14. In a machine for cutting green corn from the cob, a cutter unit comprising a carrying body having a central opening, cutter element carrying bars having slotted end extensions, cutter elements and gages carried by the bars, bar moving devices carried by the carrying body and mounted in the opening thereof, pins projecting from the moving devices into the slotted ends of the bars, a latch member carried by the carrying body and adapted to removably secure the bars to position, and yieldable means to hold the moving devices in their normal position, said bars also having intermediate extensions, and said latch member having means to engage the intermediate extensions to hold the bars against tilting when the cutter elements and gages are being engaged by the travelling corn.

15. In a machine for cutting green corn from the cob, a cutter comprising a carrying body having a central opening, cutter element carrying bars having slotted end extensions, cutter elements and gages carried by the bars, reversely rotatable rings rotatable one on the other and in the carrying body opening, pins projecting from the rings into the slotted ends of the bars, means on the carrying body to removably hold the bars on the pins, and yieldable means to hold the rings in the normal position.

16. In a machine for cutting green corn from the cob, a cutter unit comprising a carrying body having a central opening, cutter element carrying bars having slotted end extensions, cutter elements and gages carried by the bars, reversely rotatable rings rotatable one on the other, pins projecting from the rings into the slotted ends of the bars, means on the carrying body to removably hold the bars on the pins, a lever arm projecting from each ring, and a single spring connected to the lever arms and yieldably holding the rings in the normal position.

17. In a machine for cutting green corn from the cob, a cutter unit comprising a carrying body having a central opening, cutter element carrying bars having slotted end extensions, cutter elements and gages carried by the bars, reversely rotatable rings rotatable one on the other, a pair of pins projecting from each ring, each pair of pins being adapted to project one into one slotted end of one bar and the other into the opposite slotted end of the opposite bar, means on the carrying body to removably hold the bars on the pins, and yieldable means to hold the rings in the normal position.

18. In a machine for cutting green corn from the cob, a cutter unit comprising a carrying body having a central opening, cutter element carrying bars having slotted end extensions, cutter elements and gages carried by the bars, said gages being adjustably mounted on the bars in associated relation with said cutter elements, bar moving devices carried by the carrying body and mounted in the opening thereof, pins projecting from the moving devices into the slotted ends of the bars, a latch member carried by the carrying body and adapted to removably secure the bars to position, and yieldable means to hold the moving devices in their normal position.

19. In a machine of the character described the combination with the housing having transverse mounting grooveways, of a cutter member carrying plate having opposed parallel pairs of mounting edges selectively mountable in the grooveways whereby to permit the convenient varying of the position of cutters carried by the plate relatively to the travelling corn, and cutters carried by the plate for the purposes described.

20. In a machine of the character described the combination with the housing having transverse mounting grooveways, of a cutter member carrying plate having opposed parallel pairs of mounting edges selectively mountable in the grooveways, cutter element carrying bars having slotted end extensions, cutter elements and gages carried by the bars, reversely rotatable rings carried by the plate and rotatable one on the other, pins projecting from the rings into the slotted ends of the bars, means on the plate to removably hold the bars on the pins, and yieldable means to hold the rings in the normal position.

21. In a machine for cutting green corn, knife carriers, double-ended knives mounted in said knife carriers, said knife carriers being movable toward and from one another, and double-ended gauge members adjustably mounted on said knife carriers in cooperative association with the knives to engage the corn and position the knives in accordance with the particular size of grain on the ears and of the ears of corn passing the gauge members.

22. In a machine for cutting green corn, knife carriers mounted to be movable toward and from each other, yieldable means maintaining said carriers in proximity, double-ended knives secured rigidly to said carriers, double-ended gauge members associated with said knives, means mounting said gauge members on the respective knife carriers for adjustment toward and from each other for the purpose of engaging the corn and positioning the knives in accordance with the particular size of the grain on the ears and of the ears of corn passing the gauge members.

23. In a machine for cutting green corn, knife carriers, knives secured thereto, said carriers being movable toward and from one another, gauge members adjustably mounted on said carriers for adjustment toward and from said knives whereby to position the knives accordingly to the size of grain on the cob of the ears passing through the machine for the purposes of engaging the corn and positioning the knives in accordance with the particular size of the grain on the ears and of the ears of corn passing the gauge members.

SAM D. NOGGLE.